(12) United States Patent
Fu et al.

(10) Patent No.: US 10,163,562 B2
(45) Date of Patent: Dec. 25, 2018

(54) COUPLED INDUCTOR STRUCTURE

(71) Applicant: FutureWei Technologies, Inc., Plano, TX (US)

(72) Inventors: Dianbo Fu, Plano, TX (US); Yunfeng Liu, Shenzhen (CN); Yanshen Hu, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 13/705,287

(22) Filed: Dec. 5, 2012

(65) Prior Publication Data
US 2014/0152413 A1   Jun. 5, 2014

(51) Int. Cl.
| | | |
|---|---|---|
| H01F 17/04 | (2006.01) | |
| H01F 27/38 | (2006.01) | |
| H02M 7/493 | (2007.01) | |
| H02M 7/49 | (2007.01) | |
| H02M 7/48 | (2007.01) | |

(52) U.S. Cl.
CPC ............ *H01F 27/38* (2013.01); *H02M 7/493* (2013.01); *H02M 7/49* (2013.01); *H02M 2007/4822* (2013.01)

(58) Field of Classification Search
CPC .... H01F 30/16; H01F 17/045; H01F 27/2847; H01F 3/10; H01F 30/10; H01F 27/38; H02M 7/493; H02M 7/49; H02M 2007/4822
USPC .......................... 336/221, 184, 170, 222, 200
See application file for complete search history.

(56) References Cited

U.S. PATENT DOCUMENTS

| | | | | |
|---|---|---|---|---|
| 4,099,066 A | * | 7/1978 | Beggs | ........................ 307/419 |
| 5,379,207 A | * | 1/1995 | Shah | ............................. 363/64 |
| 5,422,620 A | * | 6/1995 | Bitterli | ........................ 336/211 |
| 5,737,203 A | * | 4/1998 | Barrett | ........................... 363/75 |
| 6,822,546 B1 | * | 11/2004 | Jakab | ...................... H01F 21/08 |
| | | | | 336/170 |
| 7,398,589 B2 | * | 7/2008 | Younger et al. | ............. 29/602.1 |
| 7,609,536 B2 | * | 10/2009 | Brochu | .................. H02M 7/08 |
| | | | | 323/255 |
| 8,203,855 B2 | * | 6/2012 | Shimada et al. | ................ 363/16 |
| 2002/0167388 A1 | * | 11/2002 | Usui | ............................ 336/200 |
| 2004/0257188 A1 | * | 12/2004 | Younger et al. | ............. 336/180 |
| 2009/0134964 A1 | * | 5/2009 | Hebert | ................. H01F 17/062 |
| | | | | 336/200 |
| 2009/0289751 A1 | * | 11/2009 | Nagano | ..................... H01F 3/10 |
| | | | | 336/221 |
| 2010/0164674 A1 | * | 7/2010 | Wu et al. | ...................... 336/221 |

OTHER PUBLICATIONS

Ferrite core, Google NPL.*
Li, Wuhua, et al., "Application Summarization of Coupled Inductors in DC/DC Converters," IEEE, College of Electrical Engineering, Zhejiang University, 2009, pp. 1487-1491.

* cited by examiner

*Primary Examiner* — Elvin G Enad
*Assistant Examiner* — Kazi Hossain
(74) *Attorney, Agent, or Firm* — Slater Matsil, LLP (57) ABSTRACT

An embodiment apparatus comprises a magnetic core comprising a first side and a second side opposite the first side, a first winding comprising a first portion wound around the first side and a second portion wound around the second side, a second winding comprising a third portion wound around the first side and a fourth portion wound around the second side, wherein the second portion and the fourth portion are coupled to each other.

11 Claims, 6 Drawing Sheets

COUPLED INDUCTOR STRUCTURE

TECHNICAL FIELD

The present invention relates to an apparatus, system and method for load balancing between two inverters connected in parallel, and, in particular embodiments, to an apparatus, system and method for load balancing through a coupled inductor placed between parallel operated inverters and an output filter.

BACKGROUND

Magnetic devices include transformers, inductors and/or the like. A magnetic device typically includes a magnetic core formed of suitable magnetic materials such as ferrite, powder iron and/or the like. The magnetic device may further include a conductive winding or a plurality of conductive windings. The windings and the current flowing through the windings may generate a magnetic field, which is also known as magnetic flux. In a normal design, the magnetic core usually has a relatively high permeability in comparison with the surrounding medium (e.g., air). As a result, the magnetic flux is confined with the magnetic core, which forms a closed flux path. The magnetic flux provides a medium for storing, transferring or releasing electromagnetic energy.

Coupled inductors are widely used in the power electronics industry. A coupled inductor may comprise two windings magnetically coupled to each other. The two coupled windings may be wound on a same magnetic core (e.g., a toroid core). The first winding generates a first magnetic force, which drives a first magnetic field or flux. The flux generated by the first winding is confined with the magnetic core, which forms a closed flux path. Likewise, the second winding generates a second magnetic force, which drives a second magnetic field, which is confined with the magnetic core.

The magnetic material of the magnetic core of a coupled inductor may be of a magnetic permeability greater than that of a surrounding medium (e.g., air). However, the coupling between two windings of the coupled inductor is not perfect. There may be a leakage path between the winding and the surrounding medium having a lower magnetic permeability. The coupling between the winding the surrounding medium may generate leakage magnetic flux. In an equivalent circuit of a coupled inductor, the leakage magnetic flux is replaced by a leakage inductance.

SUMMARY OF THE INVENTION

These and other problems are generally solved or circumvented, and technical advantages are generally achieved, by preferred embodiments of the present invention which provide an apparatus, system and method for load current sharing in a direct current (DC) to alternating current (AC) power system.

In accordance with an embodiment, an apparatus comprises a magnetic core comprising a first side and a second side opposite the first side, a first winding comprising a first portion wound around the first side and a second portion wound around the second side, a second winding comprising a third portion wound around the first side and a fourth portion wound around the second side, wherein the second portion and the fourth portion are coupled to each other.

In accordance with another embodiment, a system comprises a first inverter, a second inverter, wherein the second inverter and the first inverter are connected in parallel, a coupled inductor having a first input and a second input connected to the first inverter and the second inverter respectively and an output filter coupled to the output of the coupled inductor.

The coupled inductor comprises a magnetic core comprising a first side and a second side opposite the first side, a first winding comprising a first portion wound around the first side and a second portion wound around the second side, a second winding comprising a third portion wound around the first side and a fourth portion wound around the second side, wherein the second portion and the fourth portion are coupled to each other.

In accordance with yet another embodiment, a method comprises winding a conductive wire at a first side of a magnetic core to form a first group of winding turns, extending the conductive wire from the first side to a second side of the magnetic core, winding the conductive wire at the second side of the magnetic core to form a second group of winding turns, winding the conductive wire at the second side of the magnetic core to form a third group of winding turns, extending the conductive wire from the second side to the first side of the magnetic core and winding the conductive wire at the first side of the magnetic core to form a fourth group of winding turns.

An advantage of an embodiment of the present invention is that the load currents of a plurality of inverters connected in parallel are balanced through a coupled inductor. Balanced load currents in different inverter modules of a power system help to improve the efficiency, reliability and cost of the power system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a coupled inductor structure for load current sharing in a direct current (DC) to alternating current (AC) power system having multiple inverters connected in parallel. The invention may also be applied, however, to a variety of DC/AC power systems. Furthermore, the invention may also be applied to a variety of current sharing applications. Hereinafter, various embodiments will be explained in detail with reference to the accompanying drawings.

Figure 1:
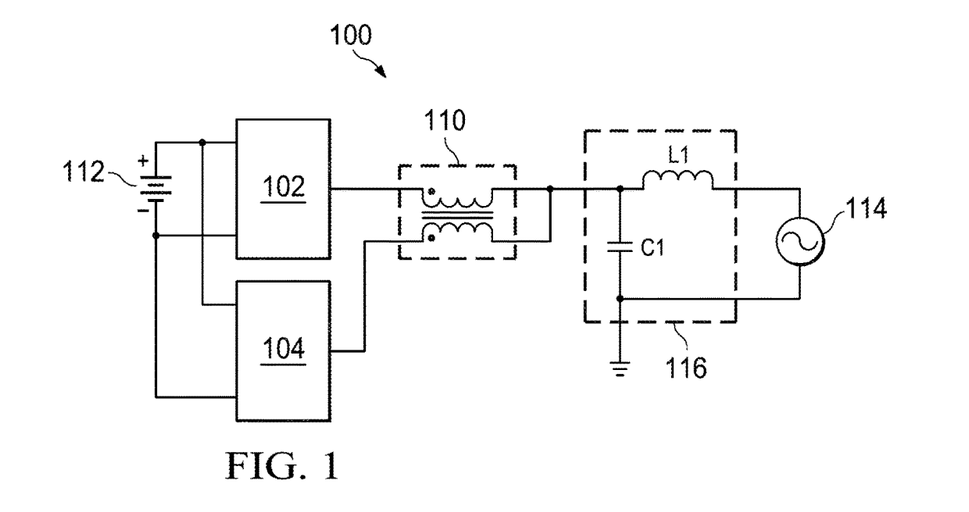
FIG. 1 illustrates a block diagram a DC/AC power system having a plurality of inverters connected in parallel in accordance with various embodiments of the present disclosure.

FIG. 1 illustrates a block diagram a DC/AC power system having a plurality of inverters connected in parallel in accordance with various embodiments of the present disclosure. The DC/AC power system 100 comprises an input DC power source 112, a first inverter 102, a second inverter 104, a coupled inductor 110, an output filter 116 and an AC power source 114. As shown in FIG. 1, the first inverter 102 and the second inverter 104 are connected in parallel. Equal current sharing may be achieved through the coupled inductor 110, which has two inputs connected to the outputs of the first inverter 102 and the second inverter 104 respectively and an output connected to the output filter 116. The current sharing mechanism will be described in detail below with respect to FIG. 2.

The first inverter 102 and the second inverter 104 inverts a DC waveform received from the input DC power source 112 to an AC waveform. In some embodiments, the first inverter 102 and the second inverter 104 may comprise a plurality of switching elements such as insulated gate bipolar transistor (IGBT) devices. Alternatively, the first inverter 102 and the second inverter 104 may include other types of controllable devices such as metal oxide semiconductor field effect transistor (MOSFET) devices, bipolar junction transistor (BJT) devices, super junction transistor (SJT) devices, bipolar transistors and/or the like. The detailed operation and structure of the first inverter 102 and the second inverter 104 will be described below with respect to FIG. 2.

The coupled inductor 110 may comprise two inductors magnetically coupled to each other. As shown in FIG. 1, the dots denote the polarity of two mutually coupled magnetic elements. The detailed operation of the coupled inductor 110 will be discussed below with respect to FIG. 2. The structure of the coupled inductor 110 will be described below with respect to FIGS. 3-5.

It should be noted that the inverters 102 and 104 and the coupled inductor 110 shown in FIG. 1 are merely examples, one person skilled in the art will realize that the inverters (e.g., inverters 102 and 104) as well as its corresponding coupled inductor 110 may be implemented in many different ways. For example, the DC/AC power system may accommodate more than two inverters connected in parallel. Accordingly, the coupled inductor 110 may comprise multiple windings, each of which is connected to one output of a corresponding inverter.

The output filter 116 may comprise an inductor L1 coupled between the coupled inductor 110 and the output AC source 114. The output filter 116 may further comprise a plurality of output capacitors coupled between the common node of the coupled inductor 110 and the inductor L1 and ground. The plurality of output capacitors are collectively shown as a capacitor C1 in FIG. 1.

The inductor L1 provides high impedance when high frequency noise tries to flow out of the inverters 102 and 104. At the same time, the capacitor C1 shunts the input of the output power source 114 and provides a low impedance channel for the high frequency noise generated from the inverters 102 and 104. As a result, the high frequency noise of the inverters 102 and 104 may be prevented from passing through the output filter 116.

It should further be noted that the inverter topologies, the output filter 116, the input DC power source 112 and the output AC power source 114 shown in FIG. 1 are provided for illustrative purposes only, and are provided only as examples of various embodiments. Such examples should not unduly limit the scope of the claims One of ordinary skill in the art would recognize many variations, alternatives, and modifications.

Figure 2:
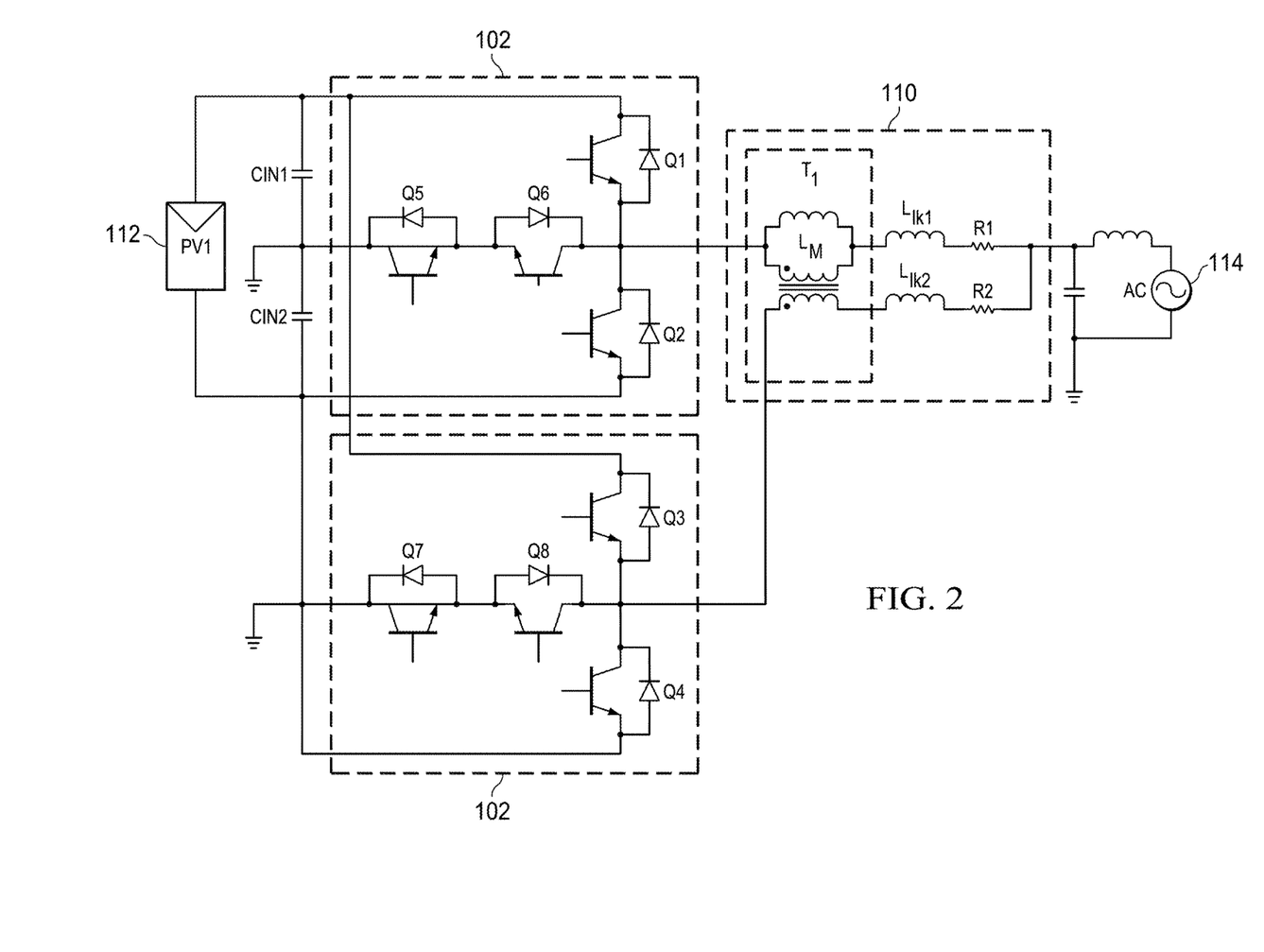
FIG. 2 illustrates a schematic diagram of the DC/AC power system shown in FIG. 1 in accordance with various embodiments of the present disclosure.

FIG. 2 illustrates a schematic diagram of the DC/AC power system shown in FIG. 1 in accordance with various embodiments of the present disclosure. An input DC voltage source 112 is coupled to the inputs of the first inverter 102 and the second inverter 104 respectively. In order to filter input noise, a plurality of input capacitors are coupled between the two output terminals of the input DC voltage source 112. More particularly, the input capacitors may comprise a first input capacitor CIN1 and a second input capacitor CIN2. The first input capacitor CIN1 and the second input capacitor CIN2 are connected in series. The common node of the first input capacitor CIN1 and the second input capacitor CIN2 is connected to ground as shown in FIG. 1.

In some embodiments, the first inverter 102 may be of the same structure as the second inverter 104. For simplicity, only the detailed structure of the first inverter 102 will be described below.

The first inverter 102 comprises a pair of switching elements Q1 and Q2 connected in series. The common node of the switching elements Q1 and Q2 are coupled to ground through an isolation device formed by back-to-back connected switching elements Q5 and Q6. The back-to-back connected switching elements Q5 and Q6 are capable of completely isolating the common node of the switching elements Q1 and Q2 from ground. According to some embodiments, switching elements Q1, Q2, Q5 and Q6 are IGBT or IGBTs connected in parallel, series and any combinations thereof.

Switching elements Q1, Q2, Q5 and Q6 are so controlled that the output of the first inverter 102 generates a three level waveform. In particular, when switching element Q1 is turned on, the output of the first inverter 102 generates a positive voltage equal to one half of the voltage of the input DC power source 112. Likewise, when switching element Q2 is turned on, the output of the first inverter 102 generates a negative voltage equal to one half of the voltage of the input DC power source 112. When both switching elements Q1 and Q2 are turned off and switching elements Q5 and Q6 are turned on, the output of the first inverter 102 is coupled to ground. As such, the output of the first inverter 102 is a three-level voltage waveform. The frequency of the three-level voltage waveform is approximately 60 HZ according to an embodiment.

The first inverter 102 and the second inverter 104 shown in FIG. 2 are commonly known as T-type three-level inverters. It should be noted that while FIG. 2 shows the first inverter 102 and the second inverter 104 are T-type three-level power inverters, it is within the scope and spirit of the invention for the DC/AC power system 100 to comprise other inverters, such as, but no limited to two-level inverters, three-level inverters, resonant inverters, any combinations thereof and/or the like.

The equivalent circuit of the coupled inductor 110 is shown in FIG. 2. The equivalent circuit of the coupled inductor 110 includes a transformer T1, a magnetizing inductor $L_M$, a first leakage inductor $L_{lk1}$, a second leakage inductor $L_{lk2}$, a first resistor R1 and a second resistor R2. The magnetizing inductor $L_M$ represents the magnetizing inductance through which the magnetizing flux of the coupled inductor 110 is created. The definition and the operation principle of the magnetizing inductance are well known in the art, and hence are not discussed herein to avoid repetition.

The first resistor R1 represents the winding resistance of the first winding of the coupled inductor 110. Likewise, the second resistor R2 represents the winding resistance of the second winding of the coupled inductor 110.

The magnetic material of the magnetic core may be of a magnetic permeability greater than that of a surrounding medium (e.g., air). However, the coupling between two inductors of the coupled inductor 110 may be not perfect. The coupling between the winding and the surrounding medium may generate leakage magnetic flux. Both inductors of the coupled inductor 110 may generate leakage inductance through the coupling with the surrounding medium such as air. The leakage generated by the first inductor winding is defined as $L_{lk1}$ and the leakage generated by the second inductor winding is defined as $L_{lk2}$.

As shown in FIG. 2, the magnetizing inductor $L_M$ is connected in parallel with one side of the transformer T1. The first leakage inductor $L_{lk1}$ and the first resistor R1 are connected in series and further connected to a first side of the transformer T1. The second leakage inductor $L_{lk2}$ and the second resistor R2 are connected in series and further connected to a second side of the transformer T1.

FIG. 2 further shows the first side of the transformer T1 is coupled to the output of the first inverter 102 and the second side of the transformer T1 is coupled to the output of the second inverter 104. The first inverter 102 and the second inverter 104 are connected in parallel. In order to force the load current of the DC/AC power system to distribute evenly between the first inverter 102 and the second inverter 104, the coupled inductor 110 is employed to achieve both static current sharing and dynamic current sharing.

According to some embodiments, the first leakage inductor $L_{lk1}$ and second leakage inductor $L_{lk2}$ help to achieve dynamic current sharing between the first inventor 102 and the second inverter 104. During a transition (e.g., from one output voltage level to another output voltage level), the impedance of the leakage inductors may become significant because the transition frequency is much higher than the normal operating frequency, which is about 60 Hz according to an embodiment. Such higher impedance can correct the unbalanced currents flowing through two sides of the transformer T1.

On the other hand, during normal operation mode or a static current sharing process, the resistors R1 and R2 may create a higher voltage drop in the conductive channel of the inverter, which is heavily loaded. In addition, the winding resistance is of a positive temperature coefficient. In other words, the winding resistance of highly loaded winding increases with increasing temperature caused by a higher load current. As a result, the load current is steered from the heavily loaded inverter to the lightly loaded inverter. Accordingly, static current sharing can be achieved. Both the dynamic current sharing and the static current share are well known in the art, and hence are not discussed in further detail herein.

It should be noted during a static current sharing process, the first leakage inductor $L_{lk1}$ and second leakage inductor $L_{lk2}$ may help to balance the load currents flowing through the first inventor 102 and the second inverter 104.

Figure 3:
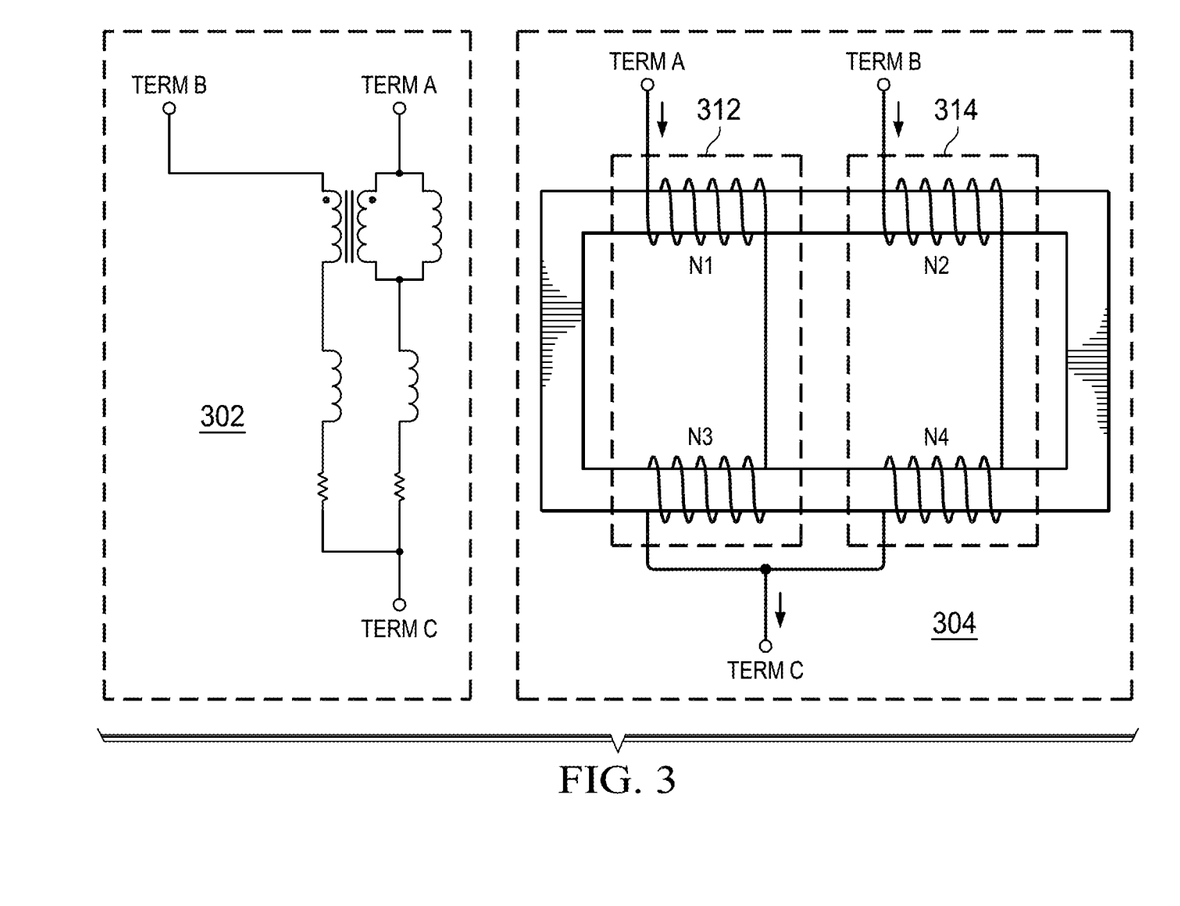
FIG. 3 illustrates an electrical equivalent circuit and an implementation of the coupled inductor in accordance with various embodiments of the present disclosure.

FIG. 3 illustrates an electrical equivalent circuit and an implementation of the coupled inductor in accordance with various embodiments of the present disclosure. The equivalent circuit 302 of the coupled inductor 110 has been described above with respect to FIG. 2, and hence is not discussed again herein.

The coupled inductor may be wound around a magnetic core as shown in FIG. 3. In accordance with an embodiment, the magnetic core is made of a magnetic material having high permeability such as ferrite, powder iron, other power suitable materials, any combinations thereof and/or the like.

The view 304 shows the coupled inductor comprises two winding coils 312 and 314 wound around a rectangular magnetic core. The first winding coil 312 is split into two portions N1 and N3. Likewise, the second winding coil 314 is split into two portions N2 and N4. As shown in FIG. 3, the portion N1 and portion N2 are coupled to input terminals Term A and Term B respectively and wound around a first long side of the rectangular magnetic core. The terminals of the portions N3 and N4 are connected together and further connected to the terminal Term C. The portions N3 and N4 are wound around a second long side of the rectangular magnetic core.

It should be noted that while FIG. 3 illustrates a rectangular magnetic core, one having ordinary skill in the art will recognize, the magnetic core described above is merely an exemplary core and is not meant to limit the current embodiments. Other magnetic cores, such as toroidal magnetic cores, two U-cores, may alternatively be used. Any suitable magnetic cores may be used, and all such magnetic cores are fully intended to be included within the scope of the embodiments discussed herein.

One advantageous feature of having multiple windings wound around the same magnetic core as shown in FIG. 3 is that in comparison with a plurality of windings wound around separate magnetic cores, the structure shown in FIG. 3 may occupy less space. As a result, the cost as well as the reliability of the DC/AC power system shown in FIG. 2 may be improved.

Figure 4:
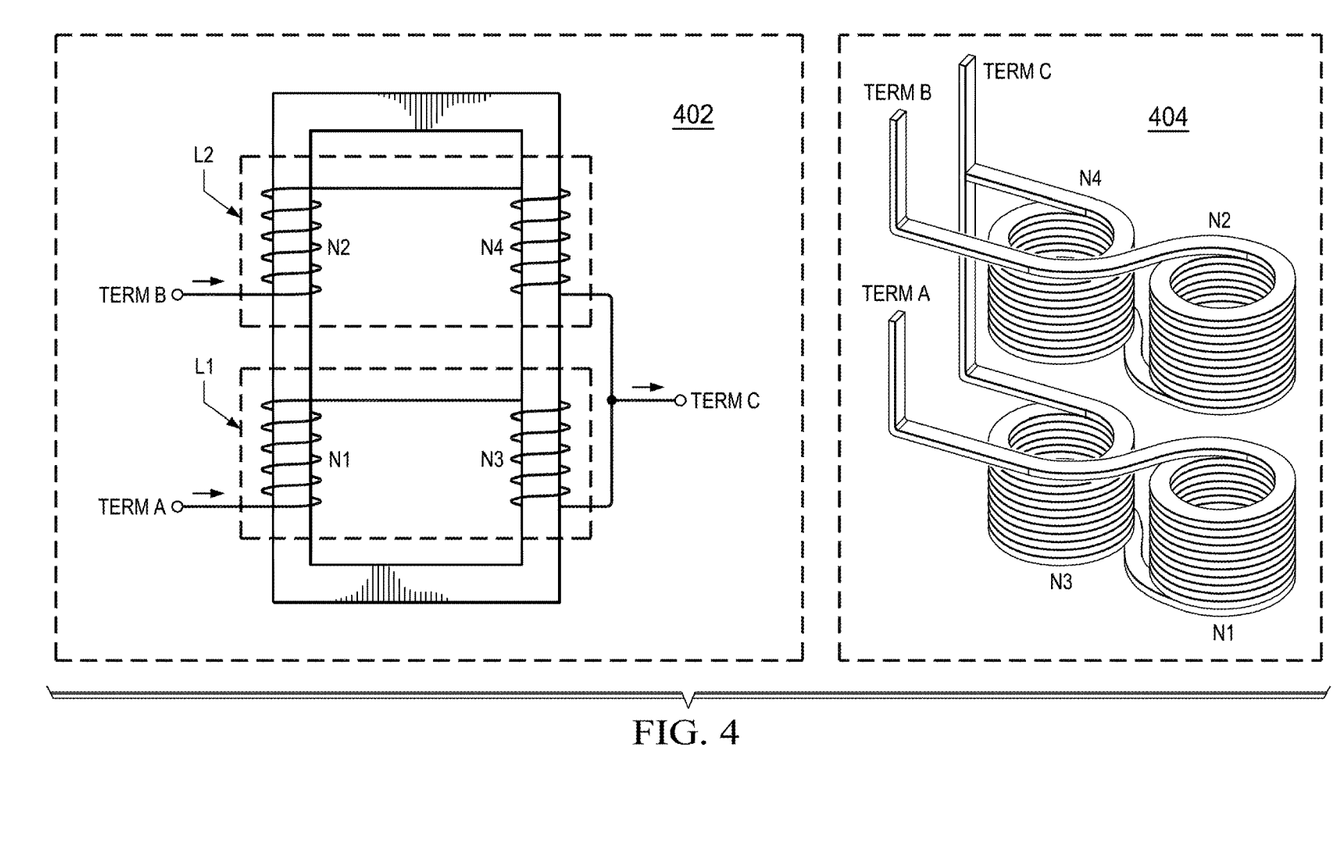
FIG. 4 illustrates an implementation of the winding coils of the coupled inductor in accordance with various embodiments of the present disclosure.

FIG. 4 illustrates an implementation of the winding coils of the coupled inductor in accordance with various embodiments of the present disclosure. The view 402 shows the coupled inductor 110 is formed by two inductors L1 and L2, wherein L1 and L2 are magnetically coupled to each other. As shown in FIG. 4, the first inductor L1 has an input Term A. The second inductor L2 has an input Term B. FIG. 4 further shows that an output of the first inductor L1 is connected to an output of the second inductor L2 to form an output Term C of the coupled inductor 110.

The winding of first inductor L1 is split between a first side of the rectangular magnetic core and a second side of the rectangular magnetic core. In particular, there may be N1 turns located at the first side of the magnetic core and N3 turns at the second side of the magnetic core. Likewise, the winding of first inductor L2 is split between a first side of the rectangular magnetic core and a second side of the magnetic core. In particular, there may be N2 turns located at the first side of the magnetic core and N4 turns at the second side of the magnetic core. In some embodiments, N1, N2, N3 and N4 are equal.

FIG. 4 further illustrates a perspective view of the windings of the coupled inductor without the magnetic core for clarity. The perspective view 404 shows an implementation of the windings of the coupled inductor through a single wire winding structure. The windings of the coupled inductor 110 may be formed by a single wire. As shown in FIG. 4, the wire has a first terminal Term A. The wire may wrap N1 turns around a first side of a magnetic core (not shown) and then extend from the first side of the magnetic core to a second side of the magnetic core. The wire wraps N3 turns around the second side of the magnetic core to form a first group of winding turns at the second side of the magnetic core. As shown in FIG. 4, the wire may extend along the second side to a far end of the second side. Furthermore, the wire may wrap N4 turns around the second side of the magnetic core to form a second group of winding turns. The common node between the first group of winding turns and the second group of winding turns may function as the output Term C of the coupled inductor 110.

Once the wire wraps N4 turns around the second side, the wire extends from the second side of the magnetic core to the first side of the magnetic core. The wire may wrap N2 turns around the first side and finish at Term B. It should be noted that N1, N2, N3 and N4 are wound in the same direction. In other words, the magnetic fields generated by windings N1, N2, N3 and N4 are in the same direction.

One advantageous feature of having a single wire winding structure shown in FIG. 4 is that the single wire winding structure may simplify the manufacture process of the coupled inductor. As a result, the cost as well as the reliability of the coupled inductor shown in FIG. 4 may be reduced. In a conventional coupled inductor, two winding wires are employed and the terminals of the two winding wires may be connected together through a bolt. Such a bolt may cause a reliability issue if it is not assembled correctly.

It should be noted the windings N1, N2, N3 and N4 may be implemented by a single wire as described above. Alternatively, the winding N1, N2, N3 and N4 may be implemented by two wires. In particular, a first wire is employed to form windings N1 and N3. A second wire is employed to form windings N2 and N4. A first terminal of the first wire is a first input Term A of the coupled inductor. A first terminal of the second wire is a second input Term B of the coupled inductor. The second terminal of the first wire and the second terminal of the second wire are coupled together to form the output Term C of the coupled inductor.

Figure 5:
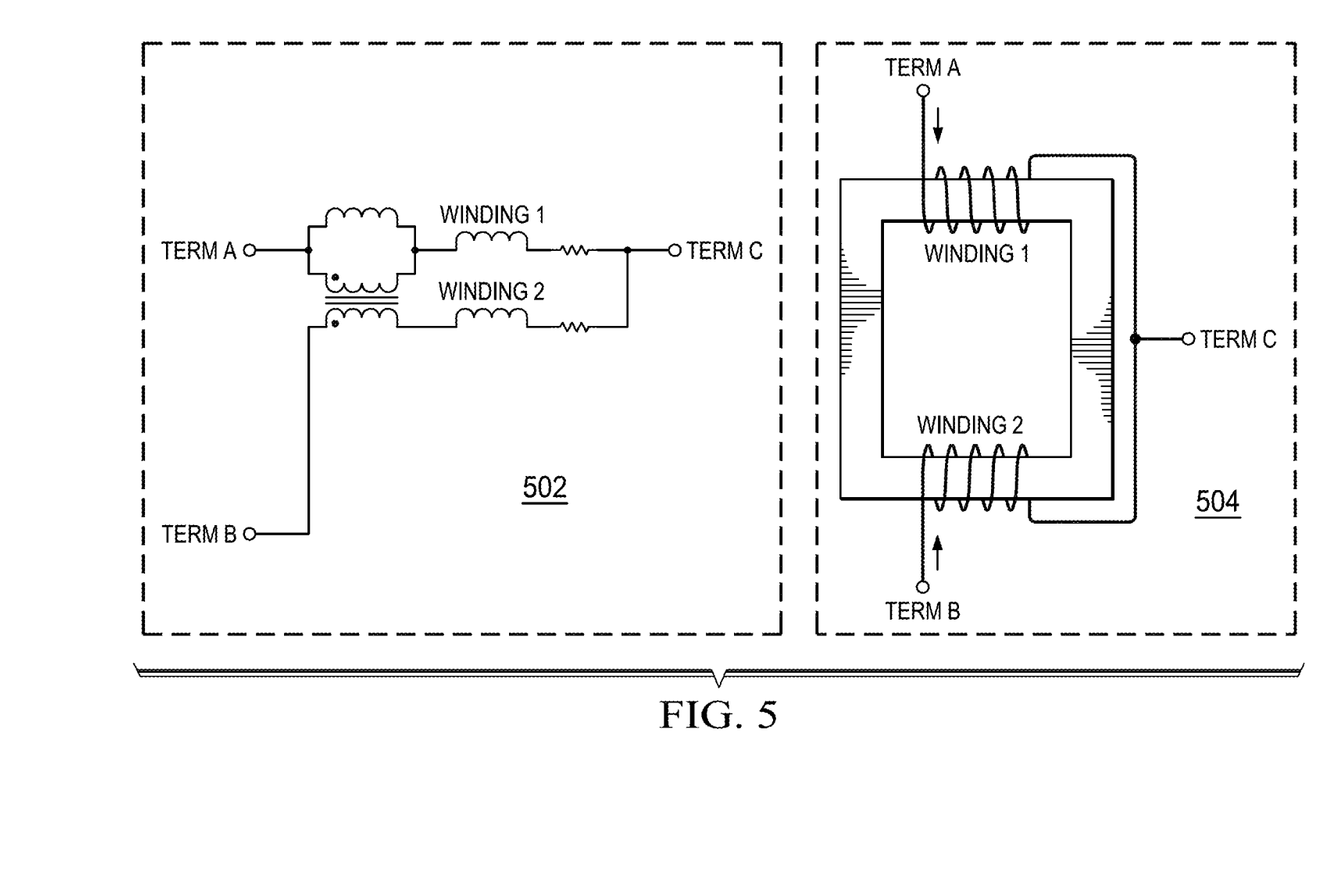
FIG. 5 illustrates an electrical equivalent circuit and another implementation of the coupled inductor in accordance with various embodiments of the present disclosure.

FIG. 5 illustrates an electrical equivalent circuit and another implementation of the coupled inductor in accordance with various embodiments of the present disclosure. The winding coil arrangement shown in FIG. 5 is similar to that shown in FIG. 3 except that the split-winding structure shown in FIG. 3 is replaced by a single winding shown in FIG. 5. As shown in FIG. 5, the first winding coil is wound around a first long side of a rectangular magnetic core and the second winding coil is would around a second long side of a rectangular magnetic core. The first winding coil is coupled between Term A and Term C and the second winding coil is coupled between Term B and Term C.

Figure 6:
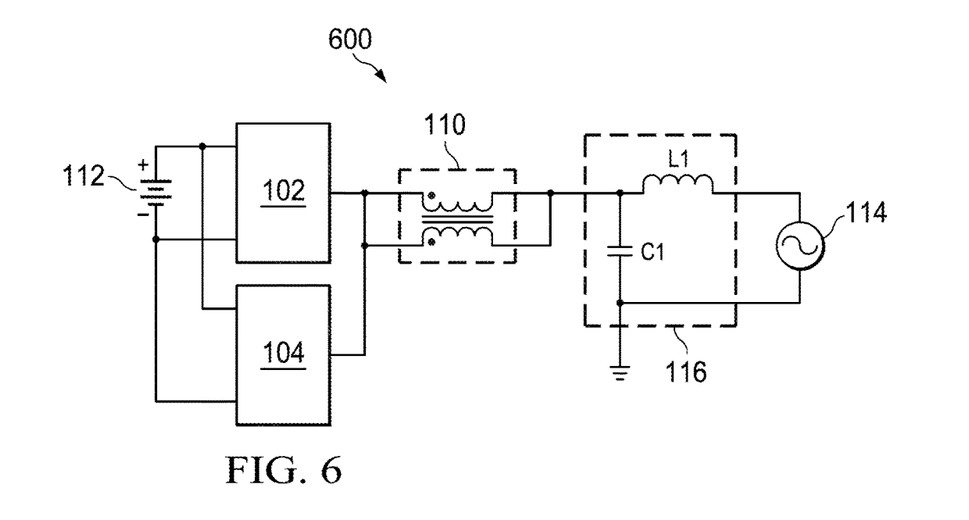
FIG. 6 illustrates a block diagram another DC/AC power system having a plurality of inverters connected in parallel in accordance with various embodiments of the present disclosure.

FIG. 6 illustrates a block diagram another DC/AC power system having a plurality of inverters connected in parallel in accordance with various embodiments of the present disclosure. The configuration of the DC/AC power system 600 shown in FIG. 6 is similar to the DC/AC power system 100 shown in FIG. 1 except that the two input terminals of the coupled inductor are connected to each other and then connected to the output of the first inverter 102 and the output of the second inverter 104. The detailed operation of a DC/AC power system having a plurality of inverters connected in parallel has been described above with respect to FIG. 1, and hence is not discussed again herein.

Figure 7:
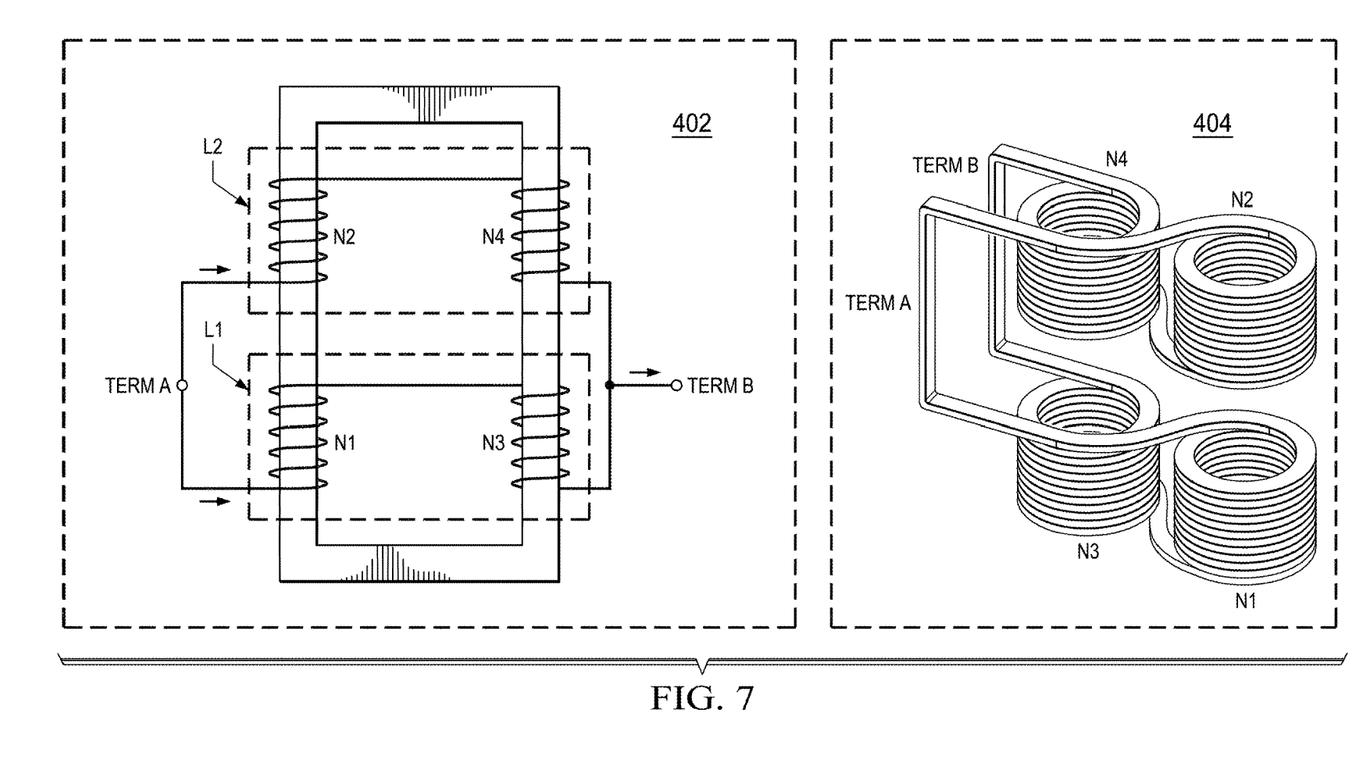
FIG. 7 illustrates an implementation of the winding coils of the coupled inductor shown in FIG. 6 in accordance with various embodiments of the present disclosure.

FIG. 7 illustrates an implementation of the winding coils of the coupled inductor shown in FIG. 6 in accordance with various embodiments of the present disclosure. The winding coils shown in FIG. 7 are similar to the winding coils shown in FIG. 4 except that the two input terminals are connected together to form a single input Term A. The windings N1, N2, N3 and N4 are similar to those shown in FIG. 4, and hence not described herein to avoid repetition.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising:
 a magnetic core comprising a first side and a second side opposite the first side;
 a first winding comprising:
  a first portion wound around the first side; and
  a second portion wound around the second side, wherein the first winding is configured to flow a first current from the first portion of the first winding to the second portion of the first winding;
 a second winding comprising:
  a third portion wound around the first side; and
  a fourth portion wound around the second side, wherein the second portion and the fourth portion are coupled to each other, wherein the second winding is configured to flow a second current from the third portion of the second winding to the fourth portion of the second winding, and wherein:

the first portion and the third portion are wound around the first side in a same direction; and the second portion and the fourth portion are wound around the second side in a same direction, and wherein the first portion, the second portion, the third portion and the fourth portion are formed by a single winding wire, and wherein a bottom surface of a bottommost turn of the first portion is level with a bottom surface of a bottommost turn of the second portion, and a bottom surface of a bottommost turn of the third portion is level with a bottom surface of a bottommost turn of the fourth portion, and wherein the bottommost turn of the second portion and the bottommost turn of the first portion are connected by a first curved connection element, and the bottommost turn of the fourth portion and the bottommost turn of the third portion are connected by a second curved connection element, and wherein the first curved connection element and the second curved connection element are parallel to each other, and wherein a first terminal of the single winding wire and an uppermost turn of the first portion are connected by a third curved connection element, and a second terminal of the single winding wire and an uppermost turn of the third portion are connected by a fourth curved connection element, and wherein the third curved connection element and the fourth curved connection element are parallel to each other.

2. The apparatus of claim 1, wherein:
the magnetic core is a rectangular magnetic core.

3. The apparatus of claim 1, wherein:
a first terminal of the first winding and a first terminal of the second winding are two input terminals of a coupled inductor; and
a second terminal of the first winding and a second terminal of the second winding are coupled together to form an output terminal of the coupled inductor.

4. The apparatus of claim 1, wherein:
the first winding spirally wraps around the first side, extends from the first side to the second side and spirally wraps around the second side; and
the second winding spirally wraps around the first side, extends from the first side to the second side and spirally wraps around the second side.

5. The apparatus of claim 1, wherein:
the magnetic core is formed of ferrite.

6. The apparatus of claim 1, wherein:
the first winding and the second winding are implemented by using the single winding wire, and wherein the single winding wire is rectangular in shape from a cross sectional view.

7. The apparatus of claim 1, wherein the single winding wire is configured to:
wrap a plurality of first turns around a first end of the first side of the magnetic core;
extend from the first end of the first side of the magnetic core to a first end of the second side of the magnetic core through the first curved connection element;
wrap a plurality of third turns around the first end of the second side of the magnetic core;
extend from the first end of the second side of the magnetic core to a second end of the second side of the magnetic core;
wrap a plurality of fourth turns around the second end of the second side of the magnetic core;
extend from the second end of the second side of the magnetic core to a second end of the first side of the magnetic core through the second curved connection element; and
wrap a plurality of second turns around the second end of the first side of the magnetic core.

8. The apparatus of claim 7, wherein:
the first terminal is orthogonal to the third curved connection element; and
the second terminal is orthogonal to the fourth curved connection element.

9. The apparatus of claim 8, further comprising:
a third terminal connected to a common node of the plurality of third turns and the plurality of fourth turns.

10. The apparatus of claim 8, wherein:
the first terminal, the second terminal and third terminal are parallel to each other.

11. The apparatus of claim 8, wherein:
the first terminal, the second terminal and third terminal are on the same side with reference to the plurality of first turns, the plurality of second turns, the plurality of third turns and the plurality of fourth turns.

* * * * *